United States Patent [19]

Ou et al.

[11] Patent Number: 5,340,643
[45] Date of Patent: Aug. 23, 1994

[54] INTUMESCENT SHEET MATERIAL

[75] Inventors: Chia-Chih Ou, Lexington; Leon Bablouzian, Framingham, both of Mass.

[73] Assignee: W. R. Grace & Co.-Conn., New York, N.Y.

[21] Appl. No.: 23,297

[22] Filed: Feb. 26, 1993

[51] Int. Cl.$^5$ .......................... C08K 3/34; C09D 5/18; C09K 21/02; C09K 21/14
[52] U.S. Cl. .................... 428/283; 29/890; 106/122; 422/177; 428/289; 428/290; 428/331; 428/446; 428/457; 428/920; 523/138; 523/179
[58] Field of Search ............... 428/283, 289, 290, 331, 428/446, 457, 920; 523/138, 179; 422/177; 252/378 R; 106/122

[56] References Cited

U.S. PATENT DOCUMENTS

| | | | |
|---|---|---|---|
| 3,916,057 | 10/1975 | Hatch et al. | 428/236 |
| 4,305,992 | 12/1981 | Langer et al. | 428/324 |
| 4,385,135 | 5/1983 | Langer et al. | 523/179 |
| 4,863,700 | 9/1989 | Ten Eyck | 422/179 |
| 5,079,280 | 1/1992 | Yang et al. | 523/179 |
| 5,116,537 | 5/1992 | Yang et al. | 252/378 |

FOREIGN PATENT DOCUMENTS 58-13683  1/1983  Japan .

OTHER PUBLICATIONS

"Systems Approach for Reliable Design of Monolithic Ceramic Converters for Automotive Emissions Control"; by Suresh T. Gulati; Simposio De Engenharia Automotiva; Sep. 4–6, 1989.
"Design Considerations for Mounting Material for Ceramic Wall-Flow Diesel Filters"; by Suresh T. Gulati, Richard P. Merry; SAE Technical Paper Series; Feb. 27–Mar. 2, 1984.
"Advanced Canning Systems for Ceramic Monoliths in Catalytic Converters"; by Dieter Kattge; SAE Technical Paper Series; Feb. 29–Mar. 4, 1988.
"New Developments in Packaging of Ceramic Honeycomb Catalysts"; by Suresh T. Gulati, John Ten Eyck and Alan Lebold; SAE Technical Paper Series; Oct. 19–22, 1992.
"New Developments in Catalytic Converter Technology as Demonstrated by Mercedes-Benz 300 SL and 300 CE"; by Jorg Abthoff, Hans-Dieter Schuster, Friedhelm Nunnemann and Wolfgang Zahn; SAE Technical Paper Series; Feb. 26–Mar. 2, 1990.
"Design of Exhaust Gas Catalyst Systems for European Applications"; by H. Weltens, H. Bressler and M. Doll; SAE Technical Paper Series; Feb. 29–Mar. 4, 1988.
"Systems Approach to Packaging Design for Automotive Catalytic Converters"; by Paul D. Stroom, Richard P. Merry and Suresh T. Gulati; Society of Automotive Engineers; 1990; pp. 39–51.
"Mechanical Integrity of Ceramic Monolithic Converters" by Suresh T. Gulati and Vimal K. Pujari; Society of Automotive Engineers; 1981; pp. 243–249.

Primary Examiner—James C. Cannon
Attorney, Agent, or Firm—John J. Wasatonic; Craig K. Leon; William L. Baker

[57] ABSTRACT

Intumescent sheets are having improved expansion characteristics are disclosed. The intumescent sheets comprise an inorganic fibrous material, a binder, and a heat expandable layer mineral composition containing at least 87.5% by weight of heat expandable interstratified layer minerals comprising interstratified layers of vermiculite and biotite.

16 Claims, 1 Drawing Sheet

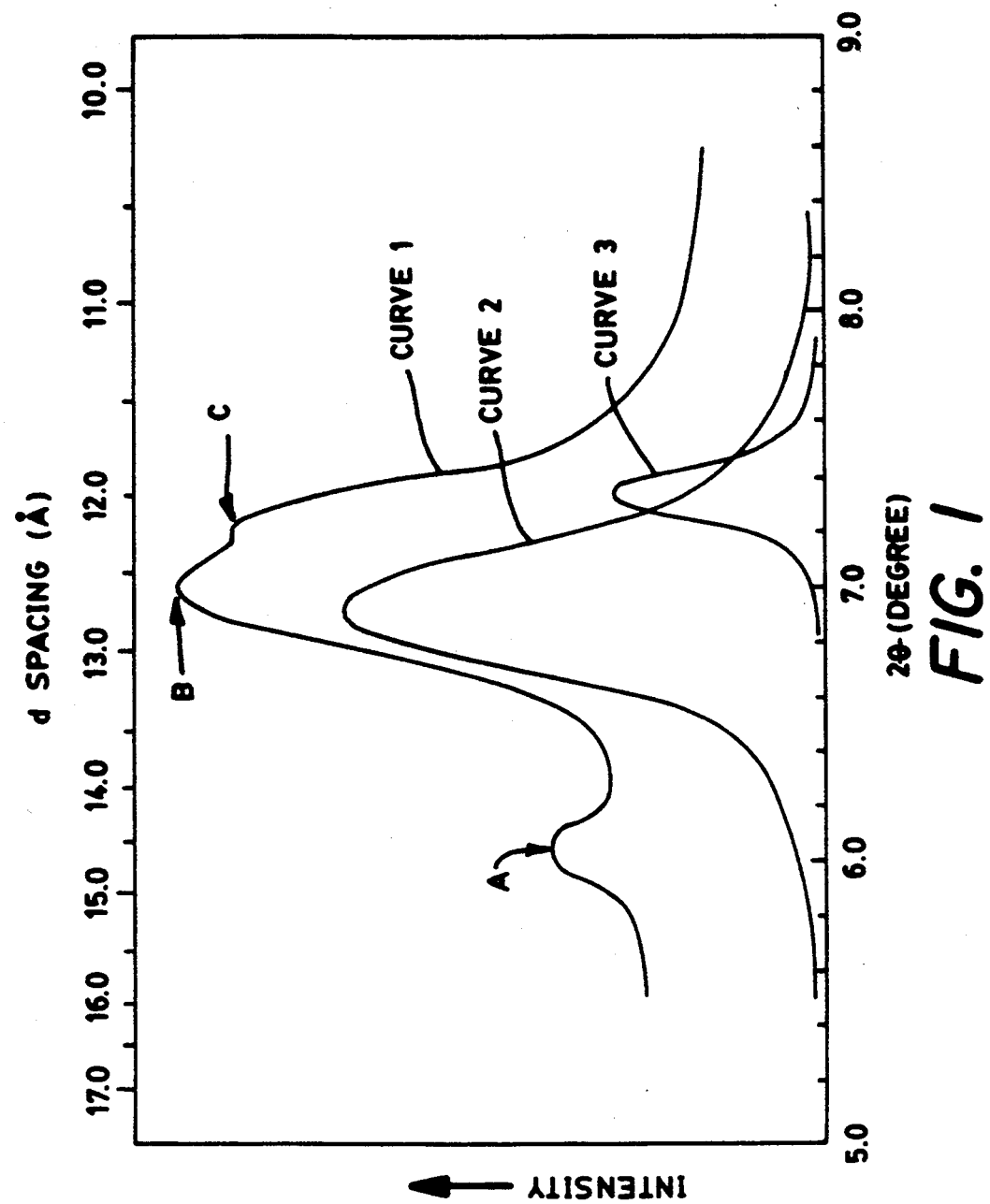

INTUMESCENT SHEET MATERIAL

FIELD OF THE INVENTION

This invention relates to an improved intumescent sheet material which is thermally resistant and is resilient after expansion. More particularly, the invention relates to an intumescent sheet material exhibiting improved expansion characteristics that does not require ion exchange of the layer mineral intumescent agent included in the sheet.

BACKGROUND OF THE INVENTION

The utility of intumescent sheets as a packing for mounting and positioning automotive catalytic converter monoliths is well known. The intumescent sheet is utilized as a mounting material by expansion in situ. The expanded sheet then holds the ceramic core or catalyst in place in the container or canister. The thermal stability and resilience of the sheet after expansion protects the core from thermal and mechanical shocks by compensating for the difference in thermal expansion of the metal canister and the ceramic substrate, vibration transmitted to the fragile device, and for irregularities in the metallic or ceramic surfaces. Thermal and/or mechanical shocks may cause deterioration of the ceramic substrate, which, once started, quickly accelerates and renders the device useless.

The performance of the intumescent sheet used in the aforementioned catalytic converter application can generally be characterized by TMA (Thermal Mechanical Analysis). The test consists of placing a sample of the intumescent sheet in a thermo-mechanical analyzer under load and monitoring the thickness change as a function of increasing temperature. Typically, a 50 psi (pounds per Square Inch) load is applied and thickness change is monitored from ambient to approximately 1000° C. at a temperature ramp rate of 10°-20° C./min. Important TMA performance values include maximum negative expansion, initial expansion temperature, maximum expansion achieved, and the extent of expansion at 800° C.

It is generally understood by those skillful in the art that minimizing negative expansion, decreasing initial expansion temperature, increasing maximum expansion, and maintaining a substantial percentage of the maximum expansion are all desirable TMA characteristics. For example, minimal negative expansion and a low initial expansion temperature reduces the risk of damage to the fragile monolith during initial automobile start-up, increasing maximum expansion raises the holding pressure thus better securing the monolith in the canister, and maintaining a substantial percentage of the maximum expansion sustains a sufficient holding pressure on the monolith. Holding pressure is the pressure generated by the intumescent sheet as it expands in the gap between monolith and metal housing. Insufficient sheet performance as measured by these criteria can result in mechanical and/or thermal shock to the catalyst support and subsequent loss of converter functionality.

Industrial vermiculite is commonly used as the expandable component in intumescent sheets. Vermiculite is a micaceous mineral, chemically identified as a hydrated magnesium-aluminum-iron silicate and characterized by a layered structure which exfoliates or expands in one dimension when heated at high temperatures or subjected to various chemical treatments, so as to be increased to many times its original size. Industrial vermiculite occurs naturally in an unexpanded state, and is mined in conventional manner. Since vermiculite as it is mined is in the form of vermiculite ore is associated with other minerals as impurities, the crude vermiculite ore, after being reduced to particle size, has generally been beneficiated by various concentrating methods well known in the art wherein the gangue material is separated from the vermiculite particles as much as possible, and the vermiculite screened into a number of component sizes. Vermiculite has generally been regarded as the basic constituent contributing to the increased holding pressures and high temperature resiliency of intumescent sheets used in catalytic converters (Merry, R. P. and Gulati, S. T., "Design Considerations for Mounting Material for Ceramic Wall-Flow Diesel Filters", SAE Paper 811324, 1981).

U.S. Pat. No. 3,916,057 discloses an intumescent sheet comprising unexpanded vermiculite, inorganic fibrous materials, and binders suitable for such a purpose. One disadvantage of this sheet is that it undergoes negative expansion when exposed to temperatures from approximately 100° C. to 400° C. U.S. Pat. No. 4,305,992 partially overcomes this deficiency by disclosing an intumescent sheet comprised of ammonium exchanged vermiculite, inorganic fibrous materials, and binders. The negative expansion in this region is generally improved, initial expansion temperature is decreased by approximately 70°-180° C., and the maximum expansion of the material increases. However, ammonium exchange is costly, and disposal of the ammonium solutions must be monitored closely as such a solution is considered potentially harmful to the environment. U.S. Pat. No. 5,079,280 discloses a further improvement in the negative expansion region and in initial expansion temperature for intumescent sheet materials by using vermiculite subjected to potassium nitrate solution such that ion exchange with potassium occurs. Since potassium nitrate can be recycled as a fertilizer without risk to the environment, it is desirable from a disposal standpoint of view. However, a costly ion exchange process is still necessary to reduce both negative expansion and initial expansion temperature.

Furthermore, one other drawback of the exchange treatment is that the treatment diminishes the high temperature (e.g. expansion at 800° C.) performance of intumescent sheets.

More stringent air emission requirements have initiated a trend to hotter automotive exhaust systems. Achieving the above desirable TMA characteristics and the higher temperature durability requirements for expanded intumescent sheets has become more difficult.

The intent of this invention is to develop intumescent sheets with improved maximum negative expansion, maximum expansion characteristics and high temperature stability without the need for an ion exchanged expandable component.

SUMMARY OF INVENTION

The present invention relates to intumescent sheet materials, and particularly intumescent sheet materials comprising, as the expandable material, a heat expandable mineral component which comprises at least 87.5% by weight of selected interstratified mineral species. These intumescent sheet materials exhibit advantageously lower initial expansion temperatures and improved maximum expansion characteristics over prior intumescent sheet materials containing conventional vermiculite as the expanding agent.

The interstratified mineral species of the expandable component are micaceous minerals having a hydrated magnesium-aluminum-iron silicate structure and comprising interstratified layers of vermiculite and biotite. These species are identified as hydrobiotite and the family of mineral species referred to herein as partially ordered interstratified (POI) materials, described in detail hereinafter. These mineral species are further identified by various common characteristics and parameters which distinguish them from other micaceous minerals, such as conventional vermiculite. The parameters are 1) a vermiculite to biotite ratio of 1 or less; 2) average spacing between the repeating layers which is in the range of 10.2 to 12.8 Å; and 3) about 4 or less interlayer water molecules per formula unit.

According to this invention, the heat expandable component material is incorporated into heat expandable intumescent sheets which further comprise one or more inorganic fibrous materials and one or more binders.

DETAILED DESCRIPTION OF THE INVENTION

Vermiculite is a mineral species which, in pure form, consists of repeating magnesium-aluminum-iron silicate trioctahedral sheets (which are each about 9.5 angstrom thick) separated by hydrated cations and water molecules. The hydrated cations and water molecules occupy a space with is about 5 angstrom (Grim, Ralph, "Clay Mineralogy, Second Edition", McRaw-Hill, 1968, pg. 105). These trioctabedral sheets with the associated cation and water molecules comprise the basic vermiculite layer. The layers are stacked in a repeating sequence along the c-axis (the axis which is perpendicular to the plane of the vermiculite platelet). As used herein, the term "vermiculite" refers to this pure mineral species and the individual layer structure which is characteristic of this mineral species.

Techniques used to characterize clay minerals include x-ray diffraction to measure the characteristic spacing between the mineral layers, referred to as $d_{00l}$ spacing, identification of cations occurring between the layers (also called interlayer cations), water content, and $Fe^{2+}/Fe^{3+}$ ratio. Of these, x-ray diffraction is the most common and useful tool. The $d_{00l}$ is the characteristic c-dimension spacing consisting of the repeating unit cell including: the trioctahedral sheet, interlayer cations, and water molecules. For example, $d_{00l}$ for vermiculite and biotite is 14.6 and 10.1 angstrom (Å), respectively.

Biotite is also a naturally occurring mineral of repeating magnesium-aluminum-iron silicate sheets, associated with potassium to form the biotite layer structure. Biotite differs from vermiculite in terms of the spacing between the layers, the interlayer cations, the interlayer water, and the $Fe^{2+}/Fe^{3+}$ ratio, as shown in Table I.

TABLE 1

| General Comparison of Biotite and Vermiculite | | |
|---|---|---|
| | Biotite | Vermiculite |
| $d_{00l}$ spacing (angstrom) | 10.1 | 14.6 |
| interlayer cations | $K^+$ | $Mg^{2+}$, $Ca^{2+}$ |
| number of water molecules per formula | 0 | ~8 |
| $Fe^{2+}/Fe^{3+}$ ratio | low | high |

Thus, biotite, which is considered to be a precursor for vermiculite during the geological weathering sequence, contains a tightly held potassium cation with no interlayer water molecules, accounting for the smaller spacing between the layers.

The terms mixed layer and interstratification describe layer structures in which two or more kinds of layers occur in the vertical stacking sequence along the c-axis (Brindley, G. W. and Brown, G., "Crystal Structures of Clay Minerals and Their X-Ray Identification", Mineralogical Society, London, 1980 pg. 249). Reported instances of interstratified clays comprise a relatively small number of types despite the large number of possibilities. Dominant species involve two components.

Interstratification can be random, for which no discernible pattern exists in the sequence of layer types, ordered, according to various periodic stacking schemes, or partially ordered, that is to say, intermediate between the extreme cases. A well known ordered interstratified layer mineral is hydrobiotite, which consists of a regularly alternating interstratification of vermiculite layers (A) and biotite (B) layers in the sequence ABABABAB . . . Characteristic $d_{00l}$ spacing and water content for these three species is shown in Table II.

TABLE II

| | Vermiculite | Hydrobiotite | Biotite |
|---|---|---|---|
| $d_{00l}$ (angstrom) | 14.6 | 12.4 | 10.1 |
| Water molecules per formula | ~8 | ~4 | 0 |

Partially ordered interstratified materials (POI), as used herein, refers to the family of mineral species in which vermiculite and biotite layers are interstratified in a partially ordered or random arrangement. The structure and composition of each individual species in the family depends on two factors: A/B ratio and the degree of order in the stacking sequence. One of the limiting cases of POI is totally random interstratification with no predictable sequence. The position of the $d_{00l}$ peak of POI is between 12.3 and 10.2 angstrom. The exact position and peak profile depends on the above two factors. The peak shape of POI is often broader than those of vermiculite and hydrobiotite, and asymmetric with a shoulder extending towards 10 angstrom. This peak characteristic of POI indicates that several different species of POI may coexist simultaneously. The peak position and profile is the sum of peaks for each individual mineral.

In contrast to pure vermiculite, the term "industrial vermiculite" is used herein to refer to the commonly occurring, mined vermiculite material which has been used commercially in intumescent sheets. This material has a relatively high content of vermiculite, and generally also contains hydrobiotite. Relatively minor amounts of the series of minerals associated with partially ordered and random interstratification, are occasionally found in certain samples. Table III summarizes the typical characteristics of these constituents of industrial vermiculite.

TABLE III

| | Vermiculite | Hydrobiotite | POI |
|---|---|---|---|
| Distinct Species or Family of Mineral Species | species | species | family |
| Interstratification | none | regular | partially ordered/ random |

TABLE III-continued

|  | Vermiculite | Hydrobiotite | POI |
|---|---|---|---|
| A/B | ∞ | 1 | <1 |
| Interlayer Water per Formula | ~8 | ~4 | <4 but greater than zero |
| Cation(s) | $Mg^{2+}$, $Ca^{2+}$ | $K^+$, $Mg^{2+}$, $Ca^{2+}$ | $K^+$, $Mg^{2+}$, $Ca^{2+}$ |
| $d_{001}$ (Å) | 14.0 to 14.9 | 12.3 to 12.8 | Less than 12.3 but greater than 10.1 |
| Peak shape | symmetric | symmetric | asymmetric |
| Peak Broadness | — | — | often broad |

*The atomic ratio of $K^+/[Mg^{2+} + Ca^{2+}]$ is 2 for hydrobiotite; the ratio is larger than 2 for POI.

Unexpectedly, the inventors have discovered that intumescent sheets prepared using the interstratified layer minerals described herein show improved TMA performance when compared to conventional intumescent sheets containing industrial vermiculite. This was a surprising result because interstratified minerals (both hydrobiotite and POI) contain less interlayer water (see Table II) than vermiculite. Interlayer water is generally considered to be the common exploding agent to cause these minerals to expand when subjected to heat.

Additionally, it has been unexpectedly found that the presence of vermiculite in the heat expandable mineral composition adversely affects TMA performance in intumescent sheet. (In this context, "vermiculite" refers to the pure vermiculite mineral, not the vermiculite layers of the interstratified minerals.) Thus, as the proportion of vermiculite in the composition increases, TMA performance deteriorates. Accordingly, the heat expandable mineral compositions of this invention contain minimal amounts of vermiculite, and preferably no vermiculite, as further discussed hereinafter.

As mentioned earlier, a typical TMA performance has at least four criteria: maximum negative expansion (NE), initial expansion temperature ($T_i$), maximum relative expansion (MRE), and the extent of relative expansion at 800° C. ($RE_{800}$). We have discovered that the presence of hydrobiotite and POI minerals in the sheets affects these four criteria, often in different ways. For example, POI is better than hydrobiotite in improving NE and $T_i$ while the latter mineral is a more desirable ingredient for $RE_{800}$. Hydrobiotite and POI minerals are comparable for improving MRE.

A simple procedure to determine the required mineral composition to make an improved intumescent sheet of this invention is as follows.

An x-ray diffraction (XRD) pattern of the mineral sample is obtained by conventional techniques. The sample should be less than 6 months old, preferably less than 2 months old, since aging can affect the peak position and profile of the XRD pattern due to moisture and other effects resulting from storage. The vermiculite peak is usually well resolved, while hydrobiotite and POI peaks are often overlapped as an asymmetric peak. Common peak mathematical fitting techniques can be used to resolve the overlapping peaks into the two separate components, if desired. However, we have found that the separation is usually not required for defining the desirable composition since the TMA performance of hydrobiotite and POI are both significantly better when compared with vermiculite.

BRIEF AND DETAILED DESCRIPTION OF THE DRAWING

A typical x-ray diffraction pattern of an interstratified layer mineral of the invention is shown in FIG. 1. In FIG. 1, Curve 1, peak A denotes the vermiculite signal, peak B is hydrobiotite, and peak C indicates the POI family component. The overlap of peaks B and C results in a shifting of the maximum for peak C. Resolution of the signals, as shown by Curves 2 and 3, shows the actual peak maximum for the POI component. The top horizontal axis defines the spacing in Angstroms between the layers of the respective mineral species, while the area of the peaks indicates the relative amounts by weight. The vermiculite is a minor component, constituting less than 12.5% by weight of the total weight of vermiculite, hydrobiotite, and POI.

From the XRD pattern, the peak areas of vermiculite peak ($P_1$) and the hydrobiotite/POI peak ($P_2$) are measured. Common peak integration methods, including a computerized peak integrator, can be used for the measurement. We have found that cutting out the peaks and weighing with an analytical balance provides a reproducible and satisfactory result. It should be noted that the peak height method is undesirable and may provide misleading results because both the width and shape of POI peaks often vary with the detailed make up of POI minerals.

For an improved intumescent sheet performance, it has been found that a $P_2/P_1$ ratio of at least 7 is required. A more preferred ratio is 10. The most preferred ratio is larger than 20. The peak area is an approximate indication of mineral content. Therefore, the required, more preferred, and the most preferred weight content of interstratified minerals, i.e., hydrobiotite plus POI, are approximately 87.5, 91 and 95% respectively. The composition may not contain more than 12.5, 9, and 5% of vermiculite respectively for the above three cases. The most preferred composition contains only interstratified layer minerals, i.e., no vermiculite. It should be noted that all percentages are the percentage of total weight of vermiculite and interstratified layer minerals. The totals do not include weight of gangue minerals (including any pure biotite material). Both biotite and gangue minerals are not heat expandable. Generally, in order to make a satisfactory sheet, it is required that the weight of biotite and other gangue materials in the expandable mineral composition is less than 10%.

Preferred compositions of this invention are those in which POI constitutes at least 5% by weight of the total weight of heat expandable interstratified mineral species, more preferably at least 15%.

Desirable heat expandable mineral compositions of this invention occur naturally. Suitable minerals have been obtained by processing of ore found in South Carolina and are available from W. R. Grace & Co.-Conn, Cambridge, Mass.

The intumescent sheet material of the invention comprises the heat expandable mineral composition, one or more inorganic fibrous material, and one or more binders. Preferably the intumescent sheet of the invention comprises about 30–85% by weight of the heat expandable mineral composition, about 5–60% by weight of the fibrous material, and about 10–70% by weight of the binder. More preferably, the sheet comprises 40–65% of the expanding agent, 25–50% of the fibrous material, and 5–15% of the binder.

Inorganic fibrous materials which may be used include glass fibers, and slag, rock, and ceramic fibers. A preferred fibrous material is ceramic.

Suitable binders can include various polymers and elastomers in latex form, as for example, natural rubber latexes, styrenebutadiene latexes, butadiene-acrylonitrile latexes, latexes of acrylate and methacrylate polymers and copolymers and the like.

The sheet material can be formed from standard papermaking techniques, either hand laid or machine laid, taking suitable precautions to attain substantially uniform distribution of particles throughout the web. The sheet material may be provided with or temporarily laminated to a backing sheet of kraft paper, plastic film, non-woven synthetic fiber web or the like as desired. Generally, the heat expandable mineral composition is combined in a large volume of water with the fibrous material and binder. Small amounts of surfactants, foaming agents, and flocculating agents may be added before forming the sheet. The sheet is then formed by standard papermaking techniques either in a hand-sheet former or Fourdrinier screen. The resulting sheet is then dried at a relatively low temperature, generally less than about 100° C., to form a handleable, flexible sheet material.

Further to the above, the sheets can be made using any of the binders and fibrous materials, and also the preparative methods, taught in U.S. Pat. Nos. 3,916,057; 4,305,992; 4,385,135; and 5,079,280, the disclosures of which are incorporated by reference herein.

Intumescent sheets of this invention can display significantly improved degrees of expansion and dimensional stability at high temperatures, such that the expanded sheet maintains a substantially greater percentage of its maximum expanded thickness in comparison to conventional sheets. Preferred sheets are those which expand by at least 65%, relative to their initial compressed thickness, when heated to 800° C. under a 50 psi load. Such preferred sheets provide superior durability and holding pressure when subjected to the hotter automotive exhaust temperatures resulting from more stringent air emission requirements.

The following examples are given for illustrative purposes only and are not meant to be a limitation on the claims appended hereto.

Example 1

Intumescent sheet materials were prepared according to the following procedure. In a Waring blender, 15.4 grams of ceramic fibers (washed Fiberfrax available from the Carborundum Co.) were added to 1000 ml water and mixed to break up the fiber. The mixture was transferred to a 2000 ml beaker and stirred with a mechanical mixer. To this mixture, 8.0 grams Hycar 1562X103 (a 40% solution of butadieneacrylonitrile latex available from B. F. Goodrich Chemical Co.) and 28.0 grams of various heat expandable mineral compositions were added while mixing. The mixture was returned to the blender and flocculated with 1.5 ml of 10% w/w aluminum sulfate (available from Fisher Scientific). The resulting slurry was poured into approximately 0.5 inch of water in an 8 inch diameter hand sheet former (available from Valley Iron Works, Appleton, Wis.) and the water drawn off. The wet intumescent sheet is then pressed at 200 pounds in a Williams press (available from Williams Apparatus Co., Watertown, N.Y.) and dried on a steam table.

TMA testing was conducted as follows. From an intumescent sheet sample, 2 samples each 0.5 inch in diameter were cut. These were carefully stacked and placed in a Thermal Mechanical Analyzer (available from Theta Industries, Port Washington, N.Y.). A 9.8 pound weight was applied yielding an effective load of 50 psi (9.8 lb/0.196 in$^2$). After 7 minutes under load, the thickness $t_o$ was noted and the sample was heated at a programmed ramp rate of 20° C./min. The thickness at a given temperature, $t_T$, was monitored by sampling the data every 10 seconds using a custom data acquisition system (developed by Theta Industries) and an IBM compatible computer.

By the methods above, intumescent sheet materials were produced and tested using samples of industrial vermiculite from different locations and two heat expandable compositions of the invention, mined and processed in South Carolina, and indicated as S. Carolina B and C in Table IV. Except for Item No. 2, none of the compositions was ion-exchanged. TMA results are summarized in Table IV and compared to those reported in U.S. Pat. No. 4,305,992. Table V presents the XRD data for each sample and a summary of TMA results. Desirable TMA characteristics are: less negative NE, higher MRE, low $T_i$, and higher $RE_{800}$.

To evaluate the relative mineralogical composition of the heat expandable compositions used to prepare the intumescent sheets, x-ray diffraction patterns were obtained using the following procedure. Approximately 5 grams of sample were ground for 10 minutes in a Spex 8000 communition mill and passed through a 100 mesh sieve. The ground materials were thoroughly mixed and then loosely packed in a 1 inch diameter diffractometer sample holder. The prepared sample were then evaluated using a Siemens D500 x-ray diffractometer with the following conditions:

| | |
|---|---|
| Tube | Cu |
| kV | 45 |
| mA | 30 |
| Start angle (2Θ) | 5.0° |
| End angle (2Θ) | 10–12° |
| Stepsize | 0.01°/step |
| Steptime | 5.0 seconds |
| Monochrometer | graphite crystal (set for CuKα 1.5405 Å) |
| Detector | scintillation counter |
| Sample rotation | yes |

Peak characteristics (d001, area) were obtained using the IDR subroutine of Siemens DIFFRAC 11 software. XRD results are also shown in Table V along with important TMA criteria.

Referring to Table IV, samples of South Carolina (SC) B and C have clearly superior TMA characteristics when compared to those reported in U.S. Pat. No. 4,305,992 for a sheet prepared according to U.S. Pat. No. 3,916,057 (Item No. 1). Furthermore, they have comparable TMA performance to item No. 2, which requires $NH_4^+$ treatment. In particular, SC B and C have the best high temperature performance as evidenced by the highest percent expansion at 800° C.

Referring to Table V, sheets prepared with industrial vermiculite associated with a major quantity of vermiculite (e.g. SC A) exhibits poor TMA performance. The SC A sample had more negative NE, low MRE, high $T_i$, and low $RE_{800}$. For a sample with a major amount of POI and a $P_2/P_1$ ratio greater than 7 (e.g. SC B), very desirable TMA characteristics such as less negative NE, low $T_i$, high MRE, and $RE_{800}$ are observed. This sample also has a favorable $T_i$, a characteristic associated with POI minerals.

Due to the presence of a relatively high amount of vermiculite, such that the $P_2/P_1$ ratio is less than 7, sheets prepared with Libby, South Africa, and Virginia industrial vermiculite samples show mediocre TMA characteristics. Though MRE and $RE_{800}$ are better than those reported for the untreated industrial vermiculite (item No. 1), the values are poorer than those of $NH_4^+$ treated material (item No. 2) and SC B & C.

12.3 A., and less than 4 water molecules per formula unit.

4. An intumescent sheet of claim 3 wherein said interstratified layer minerals contain at least 15% by weight of said POI layer minerals.

5. An intumescent sheet of claim 1 wherein said mineral composition contains at least 91% by weight of said interstratified layer minerals.

6. An intumescent sheet of claim 1 wherein said mineral composition contains at least 95% by weight of said interstratified layer minerals.

TABLE IV

| | | Expansion of Intumescent Sheet Under 50 psi Load | | | | | | | | | Max. Negative Expansion | Initial Expansion Temp |
|---|---|---|---|---|---|---|---|---|---|---|---|---|
| Item No. | | Percent Expansion @ °C. | | | | | | | | | | |
| | | 25 | 100 | 200 | 300 | 350 | 400 | 500 | 600 | 700 | 800 | | |
| 1 | U.S. Pat. No. 3,916,057 (a) | 0 | −3.4 | −9.4 | −11.1 | −11.1 | −9.8 | 3.0 | 11.0 | 11.0 | 10.3 | −11.1 | 380 |
| 2. | U.S. Pat. No. 4,305,992 (b) | 0 | −2.9 | −7.4 | 4.0 | 25.5 | 39.3 | 62.5 | 70.0 | 67.0 | 59.2 | −8.5 | 279 |
| | Std Dev (c) | 0 | 3.7 | 3.8 | 21.5 | 24.5 | 25.6 | 12.7 | 9.5 | 3.5 | 6.7 | 3.5 | 38 |
| 3. | Libby, MT | 0 | −3.9 | −11.0 | −13.5 | −14.2 | −12.5 | 43.6 | 58.7 | 62.2 | 61.7 | −14.2 | 379 |
| 4. | South African | 0 | −2.9 | −10.8 | −12.9 | −13.8 | −14.6 | −15.5 | 15.3 | 24.5 | 22.5 | −15.6 | 491 |
| 5. | Virginia | 0 | −2.9 | −9.1 | −11.3 | −11.8 | −11.0 | 16.2 | 43.1 | 48.3 | 45.6 | −11.8 | 362 |
| 6. | Dillon, MT | 0 | −4.8 | −8.6 | −9.6 | −9.3 | −5.5 | 15.1 | 30.8 | 38.7 | 38.3 | −9.6 | 301 |
| 7. | S. Carolina A | 0 | −3.6 | −15.0 | −18.4 | −19.5 | −20.3 | −17.1 | −2.9 | 6.3 | 4.7 | −20.4 | 419 |
| 8. | S. Carolina B | 0 | −2.5 | −7.5 | −8.8 | −5.9 | 2.1 | 59.0 | 78.1 | 78.0 | 67.8 | −8.8 | 308 |
| 9. | S. Carolina C | 0 | −2.9 | −11.3 | −13.1 | −13.3 | −12.5 | 32.1 | 61.3 | 71.0 | 76.0 | −13.4 | 364 |

(a) Data reported in U.S. Pat. No. 4,305,992 Table II (Column 5, 6 Ln. 15–38)
(b) Average of data reported in Table II: Examples 1–7 of U.S. Pat. No. 4,305,992 for intumescent sheets made from ammonium treated industrial vermiculite materials
(c) Standard Deviation (i.e. 1 sigma)

TABLE V

| | | XRD Results and Four Most Important TMA Criteria | | | | | | | | | | |
|---|---|---|---|---|---|---|---|---|---|---|---|---|
| Item No. | | $d_{001}$ Peaks | | Peak Area | | Peak Ratio | Mineral Assignment (c) | | | TMA Performance | | | |
| | | 1st (Å) | 2nd (Å) | P1 | P2 | P2/P1 | Major | Minor | Trace | NE | MRE | Ti | RE800 |
| 1 | U.S. Pat. No. 3,916,057 (a) | — | — | — | — | — | — | — | — | −11.1 | 11.0 | 380 | 10.3 |
| 2. | U.S. Pat. No. 4,305,992 (b) | — | — | — | — | — | — | — | — | −8.5 | 70.0 | 279 | 59.2 |
| 3. | Libby, MT | 14.5 | 12.3 | 41312 | 265830 | 6.4 | Hb | Vm | — | −14.2 | 62.2 | 379 | 61.7 |
| 4. | South African | 14.4 | 12.5 | 83336 | 417265 | 5.0 | Hb | Vm | — | −15.6 | 24.5 | 491 | 22.5 |
| 5. | Virginia | 14.4 | 11.9 | 82807 | 212848 | 2.6 | POI | Vm | — | −11.8 | 48.3 | 362 | 45.6 |
| 6. | Dillon, MT (d) | 14.4 | 11.8 | 20549 | 12167 | 0.6 | Vm | POI | — | −9.6 | 38.7 | 301 | 38.3 |
| 7. | S. Carolina A | 14.4 | 12.3 | 715009 | 178961 | 0.3 | Vm | Hb | — | −20.4 | 6.3 | 419 | 4.7 |
| 8. | S. Carolina B | 14.2 | 11.4 | 11789 | 254606 | 21.6 | POI | — | Vm | −8.8 | 78.1 | 308 | 67.8 |
| 9. | S. Carolina C | 14.6 | 12.6 | 25507 | 189972 | 7.4 | Hb | POI | Vm | −13.4 | 76.0 | 364 | 76.0 |

(a) Data reported in U.S. Pat. No. 4,305,992 Table II (Column 5, 6 Ln. 15–38)
(b) Average of data reported in Table II: Examples 1–7 of U.S. Pat. No. 4,305,992 for intumescent sheets made from ammonium treated industrial vermiculite materials
(c) Vm = vermiculute, Hb = hydrobiotite, and POI = Partially ordered interstratified minerals
(d) Dillon, MT gangue content of 24% is high

What is claimed is:

1. An intumescent sheet comprising an inorganic fibrous material, a binder, and a heat expandable layer mineral composition, said mineral composition containing at least 87.5% by weight of heat expandable interstratified layer minerals comprised of interstratified layers of vermiculite and biotite.

2. An intumescent sheet of claim 1 wherein the ratio of vermiculite to biotite in said interstratified layers is 1 or less, the average spacing between said interstratified layers is in the range of 10.2 to 12.8 Å., and said interstratified layer minerals contain 4 or less water molecules per formula unit.

3. An intumescent sheet of claim 1 wherein said interstratified layer minerals contain at least 5% by weight of partially ordered interstratified (POI) layer minerals having a vermiculite to biotite ratio less than 1, an average spacing between the layers in the range of 10.2 to 7. An intumescent sheet of claim 1 comprising about 30 to 85 percent by weight of said mineral composition, about 5 to 60 percent by weight of said inorganic fibrous material, and about 10 to 70 percent by weight of said binder, based on the weight of said sheet.

8. An intumescent sheet of claim 1 further comprising a backing sheet.

9. An intumescent sheet of claim 1, wherein said intumescent sheet is positioned for mounting an automotive catalytic converter monolith.

10. A high temperature stable intumescent sheet having a degree of expansion of at least 65 percent, relative to its initial compressed thickness, when heated to 800° C. under a 50 psi load, said intumescent sheet comprising an inorganic fibrous material and heat expandable interstratified layers of vermiculite and biotite.

11. An intumescent sheet of claim 10 further comprising a backing sheet.

12. An intumescent sheet of claim 10 wherein the ratio of vermiculite to biotite in said interstratified layers is 1 or less, the average spacing between said interstratified layers is in the range of 10.2 to 12.8 A., and said interstratified layer minerals contain 4 or less water molecules per formula unit.

13. An intumescent sheet of claim 10 further comprising a binder.

14. An intumescent sheet of claim 10, wherein said intumescent sheet is positioned for mounting an automotive catalytic converter monolith.

15. An intumescent sheet comprising an inorganic fibrous material and a heat expandable layer mineral composition, said mineral composition containing at least 87.5% by weight of heat expandable interstratified layer minerals comprised of interstratified layers of vermiculite and biotite.

16. An intumescent sheet of claim 15, wherein said intumescent sheet is positioned for mounting an automotive catalytic converter monolith.

* * * * *